D. M. MACDUFF.
COMBINED LIGHT AND AIR TRANSMITTING APPARATUS.
APPLICATION FILED OCT. 14, 1916.
1,254,520.
Patented Jan. 22, 1918.
2 SHEETS—SHEET 2.
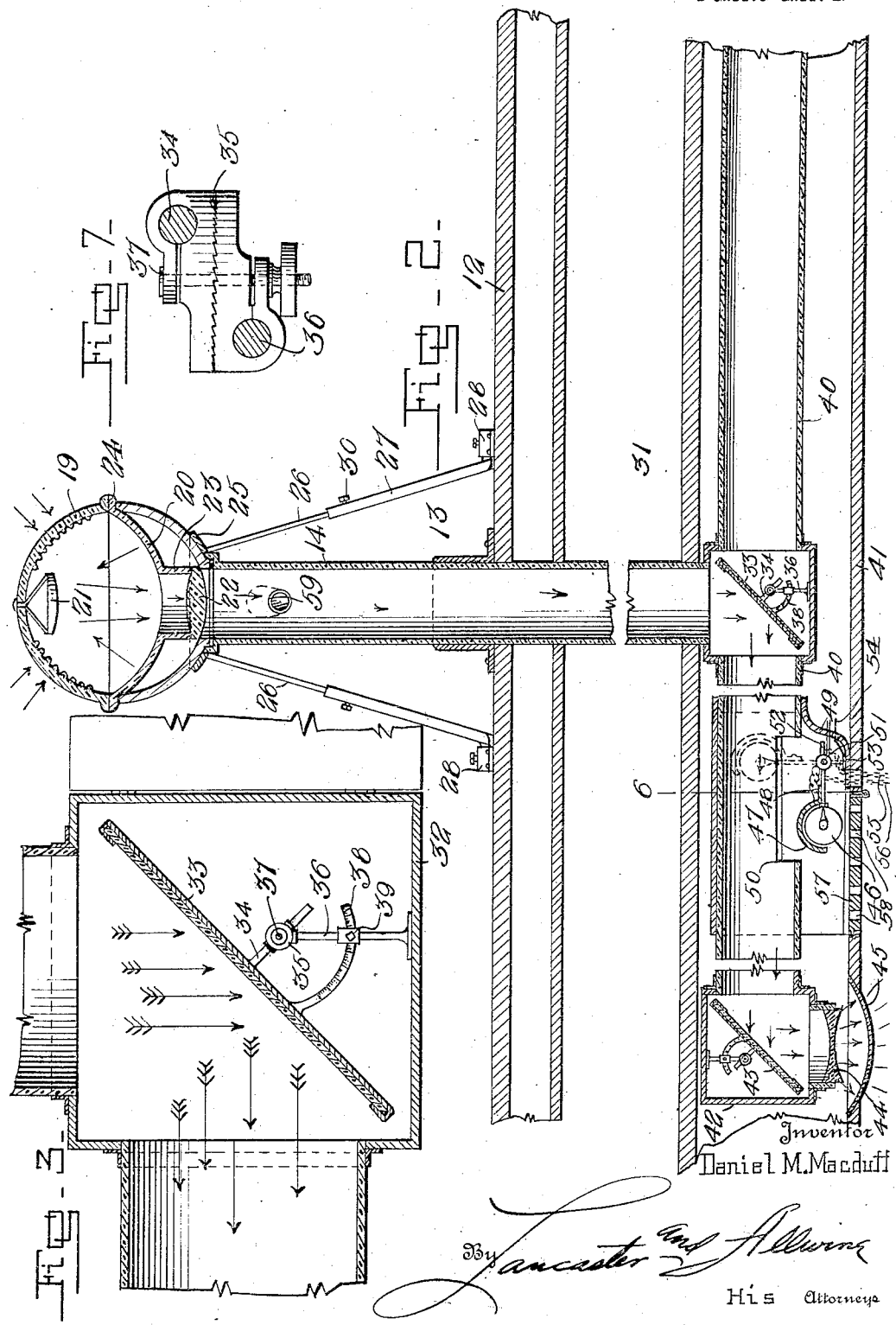
Inventor
Daniel M. Macduff

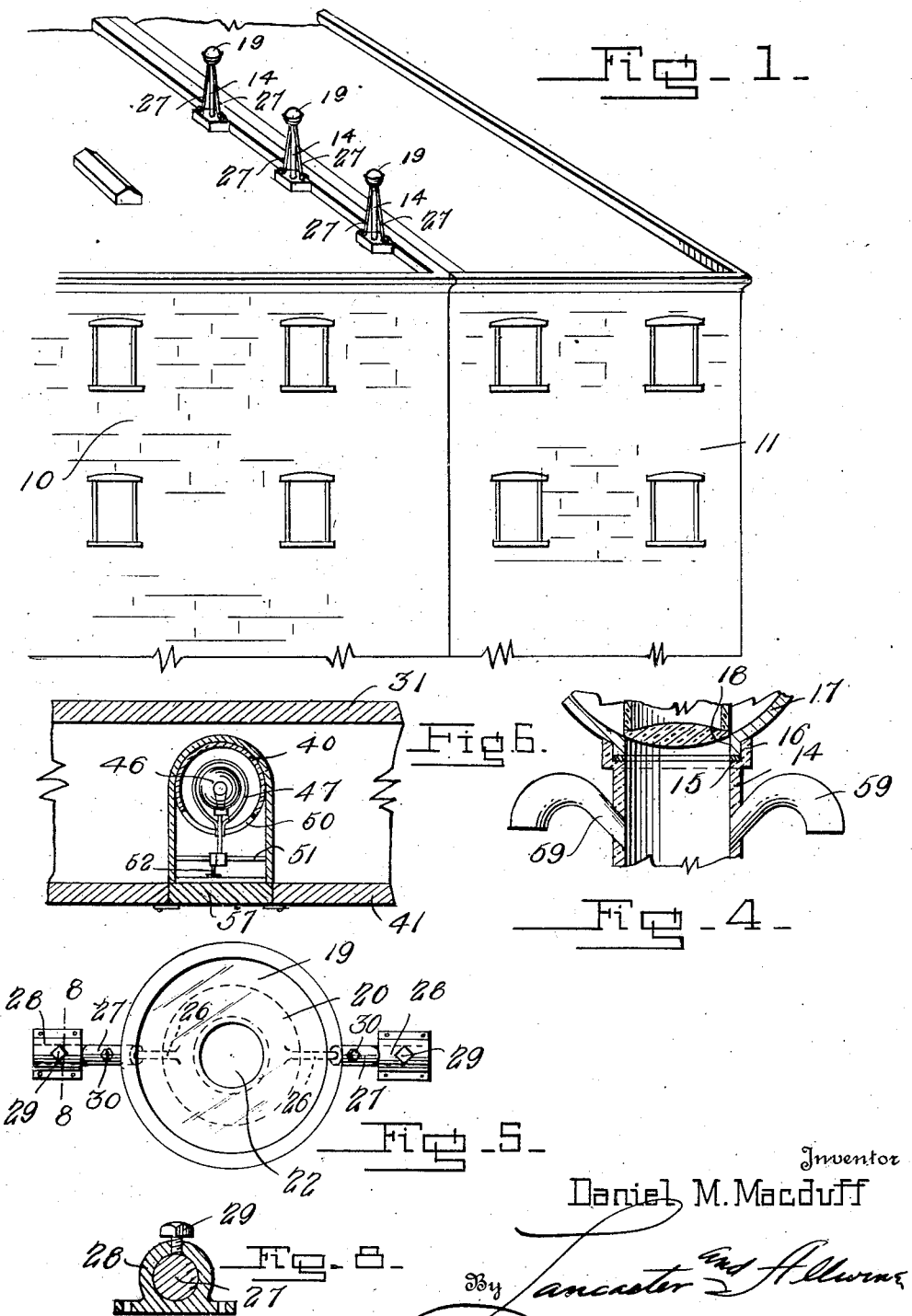

UNITED STATES PATENT OFFICE.

DANIEL M. MACDUFF, OF DETROIT, MICHIGAN.

COMBINED LIGHT AND AIR TRANSMITTING APPARATUS.

1,254,520.  Specification of Letters Patent.  Patented Jan. 22, 1918.

Application filed October 14, 1916. Serial No. 125,760.

*To all whom it may concern:*

Be it known that I, DANIEL M. MACDUFF, a citizen of the United States, and a resident of Detroit, in the county of Wayne and State of Michigan, have invented a certain new and useful Improvement in Combined Light and Air Transmitting Apparatus, of which the following is a specification.

The present invention relates to an apparatus for transmitting air and sunlight into dark closed-in portions of a building, and to thus permit of the erection of large buildings, such as stores, office buildings, apartment houses, and the like, without the loss of valuable space necessary to form courts, light-wells and air-shafts, for the proper lighting and ventilation of the building, and which are not very satisfactory for these purposes and are a source of considerable danger in case of fire.

It is an object of the present invention to provide an apparatus of this character which will illuminate, by the transmission or projection of the sun's rays, parts of floors of a building, or the like, where the sunlight is not otherwise available, and to thus render the use of electric or other artificial light unnecessary. This object of the invention contemplates the provision of means for radiating or spotting a light upon a group of machines, tables or the like located in a dark portion of a factory or a building, and to thus obtain a penetrating natural light by the generation of relatively little heat in such portions of the building.

It is generally known by those skilled in the art of illumination that the light value or efficiency of the sun's rays is substantially fifteen per cent. The light value of the most efficient modern artificial light is substantially only two per cent., figured on the basis of heat units. With these facts in view, the present invention aims at the provision of an apparatus by means of which the sun's rays may be utilized for lighting purposes, and the present object is designed to deliver, or to have a light efficiency equal substantially to fifty per cent. of the sunlight which is collected by the apparatus, so that, including all losses due to the refraction of light, the present apparatus is adapted to provide a light radiation equal approximately to three and one-half times the power or efficiency of the best modern artificial light.

It is a further object of the present invention to provide a novel apparatus for transmitting the sun's rays into parts of a building, and to supply such parts of the building with fresh air, or to carry off vitiated air therefrom, wherein the heat efficiency of the sun is utilized for the purpose of increasing the natural updraft of air through the apparatus from the closed-in part of the building.

Other objects and advantages of this invention, as well as those above outlined, will be more clearly brought out in the following specific description of the present preferred embodiment of this invention, the same being disclosed in the accompanying drawings wherein:

Figure 1 is a perspective view of two buildings erected side by side, one building cutting off the light from the adjacent side of the opposite building, the said opposite building having the combined light and air-transmitting apparatus of this invention applied thereto.

Fig. 2 is an enlarged fragmentary sectional view of the apparatus constructed according to the present invention, parts of the building being shown in section.

Fig. 3 is a further enlarged sectional view through one of the junction boxes of the apparatus.

Fig. 4 is an enlarged fragmentary sectional view of the standard adapted to be erected on the roof of the building, the lower portion of the light-collecting device being shown seated in the top of the standard, and the view being taken at right angles to the showing in Fig. 2.

Fig. 5 is a top plan view of the standard having the light-collecting means in position thereon.

Fig. 6 is a transverse section taken on the line 6—6 of Fig. 2, showing the artificial source of illumination adjusted into position for use.

Fig. 7 is a detail enlarged view of one of the artificial light-supporting clamps employed.

Fig. 8 is an enlarged transverse sectional view taken on the line 8—8 of Fig. 5, showing the pivotal mounting of the collector support.

Referring to these drawings, wherein like parts are designated by similar numerals of reference, throughout the several views, and referring particularly to Fig. 1, 10 designates a building to which is applied an apparatus constructed according to the present invention. The building is shown as being erected beside a second building 11, the latter shutting off light and air from the adjacent side of the building 10. The present invention is adapted to be applied to the building 10 in order to illuminate those portions of the building located between the front and rear thereof and to which natural sunlight and air have no access.

In Fig. 2 of the drawings, the roof 12 of the building is disclosed as being provided with an upwardly opening socket plate 13 into which is fitted the lower end of standard 14, the latter rising above the roof 12 to a considerable extent. As best shown in Fig. 4, the upper end of the standard 14 is enlarged to provide a shoulder 15 and a supporting flange 16 surrounding the shoulder. The standard 14 supports on its upper end a light collector of substantially globular form, the lower portion or shell thereof being provided with a depending annular flange 18 adapted to rest upon the shoulder 15 within the flange 16. The upper half of the light collector is in the form of a prism which is of substantially semi-globular form. The prism is adapted to receive the rays of light from practically any direction and to refract the rays of light into the lower end of the collector. In the lower end of the collector is placed a circular concave reflector 20 adapted to receive the rays of light from the prism 19, and to reflect the light upwardly and centrally onto a convex circular reflector which is mounted in the top of the prism 19, and indicated at 21, for reflecting the light rays downwardly through the open lower end of the collector. This secondary convex reflector is arranged substantially horizontally and in vertical line with one or more rectifying lenses 22 mounted in the lower end of the collector. The concave reflector 20 is provided at its middle portion with a depending neck or tube 23 adapted for engagement against the upper side of the lens 22, adjacent to the edge of the latter. The tube 23 is adapted to hold the lens 22 against the top of the flange 18. The upper edge of the reflector 20 is flared outwardly to provide a flange 24 for engagement between the lower shell 17 and the semi-globular prism 19.

The light collector is supported upon a flat ring 25 which is secured upon the upper end of a pair of diametrically opposed brace rods 26. The rods 26 are telescoped into sleeves 27, which latter are turned outwardly and oppositely at their lower ends and are mounted to turn in fixed bearings 28. As shown in Fig. 8, the sleeves or lower portions 27 of the braces may be held by set screws 29 in any position after adjustment. The bearings 28 are preferably secured to the roof 12 at the opposite sides of the standard 14. Set screws 30 are carried upon the upper ends of the sleeves 27 and engage the rods 26 to hold the same in extended position. By loosening the rods 26 the light collector may be raised slightly to unseat the flange 18 from the shoulder 15, and may then be swung laterally in either direction to bring the collector into reach for cleansing, adjusting and the like.

The standard 14 may be made in one or more sections, and extends downwardly in the building through the floor 31, and is provided immediately beneath the latter with a junction box 32. The junction box 32 may be constructed of metal, or of any other suitable material, and is preferably of the construction shown in Fig. 3. The lower end of the standard 14 enters the top of the junction box 32, and the latter is provided with an adjustable reflector 33. The reflector 33 is supported upon a stem 34 mounted upon the back thereof and which is held in place by a clamp 35 adjustably supported upon the upper end of a post 36 mounted in the box 32. As shown in Fig. 7, the clamp 35 is in the form of a pair of disks having opposed serrated faces. The opposite outer sides of the disks are formed into transversely extending sockets adapted to respectively receive the stem 34 and the post 36. The sockets are split, and a binding screw 37 passes through the disks and through the outer portions of the sockets to bind the latter upon the stem and the post, and to lock the disks together when adjusted. An arcuate brace and adjusting bar 38 is carried upon the rear side of the reflector 33 and slidably engages through a sleeve 39 which is mounted for vertical movement upon the post 36. This arcuate bar 38 is provided with graduations throughout its length by means of which the reflector 33 may be adjusted in the desired angle to reflect the rays of light in the desired direction and to the desired extent.

From one side of the junction box 32 is led a branch 40 through which the pencils of light are adapted to be reflected. The branch or tube 40 is extended beneath the floor 31, in the space between the same and the ceiling 41, to the desired part of the building or floor which it is desired to light. At this point, an outlet box 42 is mounted upon the end of the branch pipe 40, and is provided with an adjustable reflector 43 of the same construction, and mounted in the same manner as is the reflector 33 carried in the junction box 32. The reflector 33, however, is supported from the top of the box 42 and is adapted to direct light rays from the reflector 33 downwardly through the bottom of the outlet box 42. The bottom of the outlet box 42 is closed by a diffusing lens 44 beneath which, and in the ceiling 41, is mounted a preferably plano-convex panel 45 of translucent material through which the light is adapted to be diffused.

In order that the ornamental panel or lighting fixture 45 may be used at night, or when the sun's rays are not available, an electric light 46, or other source of artificial illumination, is mounted in a reflector casing 47 which is supported on a hinged post 48. The hinged post 48 is carried in the bottom of a casing 49 of greater depth than the branch tube 40, the electric light 46 being normally carried in the bottom of the casing 49. The branch tube or pipe 40 is provided in its lower side with a slot 50 adapted to register with the casing 49 and to receive therethrough the light 46 when the same is raised into line with the reflector 34 in the outlet box 42. The post 48 is supported upon a transversely extending rod 51 mounted in the lower part of the casing 49. The post 48 is also provided with a contact arm 52 adapted to wipe across a contact plate 53 located in the bottom of the casing 49, the parts being adapted for contact when the light 46 is raised into position for use. These contact pieces 52 and 53 are only diagrammatically shown in the drawing and may be of any desired construction adaptable to conditions met with in the installation of the apparatus. Electric current may be supplied through the wires 54 to the contact plate 53. The light 46 is raised into position by means of a pull chain 55 which may have insulated connection with the contact arm 52. A second pull chain 56 may be attached to the post 48 and adapted to draw the same downwardly to swing the light 46 into the lower end of the casing 49. The pull chains 55 and 56 are extended downwardly through the ceiling 41 and are of such length as to be easily grasped for operating the light 46. The casing 49 preferably has an open bottom, and the ceiling 41 is preferably provided with a hinged door or panel 57. The door 57 permits access to the interior of the casing 49 for adjusting and cleaning the light 46.

Combined with this lighting system or apparatus are means for conveying air through the tubes 14 and 40 for the purposes of ventilating different parts or floors of a building, or the like, to which air cannot otherwise be delivered or withdrawn therefrom. For this purpose, the door 57 in the ceiling 41 is preferably provided with a plurality of air passages or openings 58 communicating with the interior of the casing 49, and through the slot 50 with the branch tube 40. Vitiated air in the room is therefore permitted to escape through the openings 58 into the branch tube 40, and from there through the junction box 32 into the standard 14. This heated vitiated air rises in the tube 14 and is permitted to escape through the lateral branches 59 carried by the standard 14 adjacent to the upper end of the same. The pencils of light in the tubes 14 and 40 are adapted to heat the air rising therethrough and to thus induce a greater circulation of air through the tubes.

The reflectors 33 and 43 may be adjusted into various angles, as indicated on the arcuate bars 38, so as to vary the intensity of the light delivered to the diffusing lens 44.

The rays of light passing the prism 19 are reflected, as above set forth, and pass through the lens 22 in substantially parallel pencils of light which project downwardly through the standard 14. These pencils of light strike the reflector 33 in the junction box 32 and are reflected thereby through one of the branch tubes 40, and against the reflector 43 in the outlet box 42. Thus, the rays of light are projected through a diffusing lens 44, and finally through the panel or fixture 45, lighting the space therebeneath. The tubes 14 and 40 may be formed of glass suitably mirrored or painted upon their outer surfaces to reflect pencils of light directed against the sides of the tube incident to inaccuracies in the installation of the device, or to various angles at which the tubes may have to be installed. The reflectors 33 and 43 are thus adjustably mounted to take care of any such angular inaccuracy in the installation of the device, and to prevent the loss of any of the efficiency of the light's rays incident to the provision of too many reflecting surfaces, as such surfaces decrease the light efficiency by substantially five per cent. By the provision, therefore, of these junction boxes 32 and the outlet boxes 42, the number of reflecting surfaces is considerably diminished and the pencils of light travel in substantially straight paths through the tubes and the branches thereof.

At night, and when the sun's rays are not available, the chain 55 may be drawn downwardly to raise the light 46 into the branch tube 40. The artificial light 46 is projected by means of the reflector 47, upon the adjustable reflector 43 and from there through the diffusing lens 44 and the ornamental panel 45. By swinging the light 46 into operative position the electric circuit is closed through the light 46 as the contact members 52 and 53 are brought together by the adjustment of the light. The light 46 when not in use is held in the bottom of the casing 49 and out of the tube 40, consequently out of the path of the pencils of light projected through the branch tube.

The illustration in the accompanying drawings discloses the lenses, the reflectors, and the prisms diagrammatically only, and it is to be understood that these parts may be modified and proportioned to accomplish the results of this invention without departing from the spirit thereof, and that the standard 14 and branches 40 may be provided with any number of extensions or devices for receiving or delivering air to the standard 14, the present invention having in purpose the broad combination of an apparatus which will not only project the light to the desired parts of a building, but which will also, by the same apparatus, conduct air from such parts of the building, and deliver air thereto.

I claim:

1. In an apparatus as specified, the combination of a plurality of connected tubes, means for conducting the sun's rays in pencils through said tubes, means for producing artificial illumination in said tubes, an air vent in said tubes through which the air may circulate, the pencils of light from the sun's rays and from said artificial light being adapted to heat the air and accelerate the circulation thereof.

2. In an apparatus as specified, a plurality of connected tubes, a light collector connected to said tubes and adapted to project the sun's rays therethrough, an artificial light adjustably mounted at one side of the tubes, and means for swinging the same into and out of the path of light.

3. In an apparatus as specified, a tube, means connected to the tube for projecting daylight therethrough, an artificial light pivotally mounted at one side of the tube, and means for projecting said artificial light into the tube in the path of the daylight.

4. In an apparatus as specified, a tube, a light collector mounted on said tube and adapted to receive the sun's rays and project the same in straight pencils through said tube, diffusing means connected to one end of the tube for receiving and diffusing the pencils of light, and a source of artificial light adjustably mounted at one side of the tube and adapted to be moved into the same in the path of said pencils of light to illumine said diffusing means.

5. In an apparatus as specified, the combination of a hollow standard, a light-collecting element mounted on top of the standard, a reflector arranged beneath said element to receive rays of light therefrom and reflect the rays upwardly toward the central portion of the element, a second reflector mounted on the central portion of the element to receive said reflected light rays and being adapted to reflect the same downwardly through the standard, and means for distributing the light rays at the lower end of the standard.

6. In an apparatus as specified, a standard, a semi-globular prism mounted on the upper end of said standard, a concave reflector arranged beneath said prism to reflect rays of light from the prism upwardly to the intermediate portion thereof, a convex reflector mounted in the top of said prism adapted to reflect the rays of light from the concave reflector downwardly and centrally through the standard, a rectifying lens located in the top of said standard adapted to receive said rays of light and project the same downwardly through the standard in substantially straight pencils, and diffusing means connected to the lower end of the standard adapted to receive the pencils of light therefrom to diffuse the light for illuminating purposes.

7. In an apparatus as specified, a standard, a light collector on the upper end of the standard adapted to project pencils of light downwardly through the standard, a junction box on the lower end of the standard, a branch tube leading outwardly from one side of the junction box, a terminal box on the outer end of said branch pipe, a diffusing lens in the lower end of said terminal box, reflectors in said junction and terminal boxes adapted to reflect the pencils of light from the standard through said diffusing lens, an artificial light arranged at one side of said branch tube, said branch tube having a slot in one side adapted to receive said artificial light, and means for adjusting the artificial light in the tube for projecting the rays of the artificial light against the reflector in said terminal box for passage through the diffusing lens.

8. In an apparatus of the character described, the combination of a hollow standard, a light collector on the upper end of said standard adapted to receive the rays of the sun thereagainst and to direct the rays in substantially parallel pencils downwardly through the standard, a junction box on the lower end of the standard, a branch tube leading outwardly from one side of the junction box, a reflector in the junction box adapted to direct the pencils of rays from the lower end of the standard into said branch tube, a terminal box on the outer end of the tube, a diffusing lens in the lower side of said box, a second reflector mounted in said terminal box, a casing surrounding said tube and extending below the same, said casing being adapted to be mounted directly above the ceiling of a building, an opening in the lower side of said casing adapted to open through the ceiling, an artificial light pivotally mounted in the lower end of said casing and adapted to be raised at times into said tubes, and light controlling means mounted in said casing and having connection with the lamp support adapted to be automatically actuated upon the raising of the light into operative position in the tubes.

9. In an apparatus as specified, the combination of a tube adapted to receive the sun's rays therethrough, a diffusing member arranged at one end of said tube to receive said rays and diffuse the same for illuminating purposes, said tube being provided with an opening in one side, an electric light pivotally mounted at one side of the tube and adapted to be swung into the same in line with said diffusing elements to supplant the sun's rays when not available, and a circuit closer connected to said pivoted light adapted to be closed for energizing the light when the latter is raised into operative position in the tubes.

10. In an apparatus as specified, the combination of a tube adapted to receive the sun's rays therethrough, a diffusing element mounted on one end of the tube upon which the sun's rays is adapted to be reflected, a casing communicating with one side of the tube and adapted to rest upon the upper side of a ceiling, said ceiling having openings therethrough communicating with said casing to conduct air from the room into said casing and into the tube, lateral branches projecting from the upper end of the tube adapted to permit the exit of air from said tubes, and an artificial light adjustably mounted in said casing and adapted to be swung up into position in the tube to reflect the rays from the artificial light through said diffusing elements.

DANIEL M. MACDUFF.

Copies of this patent may be obtained for five cents each, by addressing the "Commissioner of Patents, Washington, D. C."